(12) United States Patent  
Ferlet

(10) Patent No.: US 7,746,486 B2
(45) Date of Patent: Jun. 29, 2010

(54) PELLET SORTING BY DIAMETER MEASUREMENT

(75) Inventor: Philippe Ferlet, Roquemaure (FR)

(73) Assignee: Areva NC, Paris (FR)

( * ) Notice: Subject to any disclaimer, the term of this patent is extended or adjusted under 35 U.S.C. 154(b) by 258 days.

(21) Appl. No.: 12/083,901

(22) PCT Filed: Oct. 16, 2006

(86) PCT No.: PCT/EP2006/067434

§ 371 (c)(1),
(2), (4) Date: Apr. 17, 2008

(87) PCT Pub. No.: WO2007/045625

PCT Pub. Date: Apr. 26, 2007

(65) Prior Publication Data

US 2009/0103110 A1    Apr. 23, 2009

(30) Foreign Application Priority Data

Oct. 18, 2005  (FR)  .................................. 05 53154

(51) Int. Cl.
*G01B 11/02* (2006.01)
*G01B 11/06* (2006.01)
(52) U.S. Cl. ....................... 356/635; 356/364
(58) Field of Classification Search .......... 356/625–640
See application file for complete search history.

(56) References Cited

U.S. PATENT DOCUMENTS

| | | | | |
|---|---|---|---|---|
| 4,448,680 A | | 5/1984 | Wilks et al. | |
| 4,496,056 A | * | 1/1985 | Schoenig et al. | ............. 209/539 |
| 5,043,588 A | * | 8/1991 | DiGrande et al. | ....... 250/559.06 |
| 5,147,047 A | * | 9/1992 | Ahmed et al. | ................ 209/538 |
| 5,186,887 A | * | 2/1993 | Yaginuma | .................... 376/248 |
| 5,415,295 A | | 5/1995 | Bernardin et al. | |
| 6,729,948 B2 | | 5/2004 | Engelvin et al. | |

FOREIGN PATENT DOCUMENTS

| | | |
|---|---|---|
| DE | 4124278 A1 | 1/1993 |
| FR | 2699836 A1 | 7/1994 |
| FR | 2825307 A1 | 12/2002 |
| FR | 2835604 A1 | 8/2003 |
| GB | 2335488 A1 | 9/1999 |
| JP | 9285765 A | 11/1997 |

OTHER PUBLICATIONS

International Search Report, PCT/EP2006/067434, dated Dec. 21, 2006.

* cited by examiner

*Primary Examiner*—Michael P Stafira
(74) *Attorney, Agent, or Firm*—Nixon Peabody LLP

(57) ABSTRACT

A system based on the continuous measurement (20) of the diameter of a cylindrical object (1) moving, laid down, on a belt conveyor (10) allows dimensional compliance of the latter object to be checked.

The measurement system (20) may be coupled with a sorting system based on ejection out of the conveyor (10) by projecting a gas through a transverse nozzle (42).

By means of the system according to the invention, it is possible to continuously determine whether a nuclear fuel pellet (1), in particular after rectification (2), has to be rejected or not.

12 Claims, 4 Drawing Sheets

PELLET SORTING BY DIAMETER MEASUREMENT

CROSS REFERENCE TO RELATED APPLICATIONS OR PRIORITY CLAIM

This application is a national phase of International Application No. PCT/EP2006/067434 entitled "PELLET SORTING BY DIAMETER MEASUREMENT", which was filed on Oct. 16, 2006, and which claims priority of French Patent Application No. 05 53154, filed Oct. 18, 2005.

TECHNICAL FIELD

The present invention relates to inspecting the size of cylindrical objects, and to the sorting which follows; in particular, the invention relates to a method and a device with which by measuring the diameter, the dimensions of a cylinder may be continuously evaluated and an ejection system may be controlled depending on the results.

The invention notably finds application for checking compliance of nuclear fuel pellets with the specifications required for their use in fuel pencils.

STATE OF THE PRIOR ART

During the production of nuclear fuel, as described for example in FR-A-2 825 307, pellets are obtained by pressing powders comprising fuel, followed by high temperature sintering, an operation which causes a more or less controlled shrinkage of the material. The sintered pellets are then rectified in order to obtain an accurate dimensional adjustment, compatible with the required criteria and allowing them to be subsequently grouped in sheaths in order to form the fuel pencils.

It is thus customary to check, following the rectification, the compliance of the dimensions of the pellets, in order to, according to the result, maintain them in the production line or eject them therefrom.

At many stages of the production, statistical selective inspection of the properties of the product is carried out: pellets being manufactured are picked up, and by inspecting variables of the sample, it is possible to validate a group from which it originates. For the final step after rectification, in view of the criticality of the relevant material, it is however preferable to check the dimensions of each pellet, which considerably extends the inspection time, given that the measurements are then performed batchwise after positioning each sample at the level of the measuring apparatus.

In order to accelerate the process and to multiply the number of inspections, document FR-A-2 699 836 presents simultaneous picking up of several pellets along parallel courses and inspecting each sampled group via a rotating support. Handling is however difficult and imposes equipment which is cumbersome to apply, while remaining relatively slow.

Document JP-A-9 285 765 describes an inspection of the length of the pellets, carried out in a semi-continuous way: the pellets are brought vertically into a system for inspecting the height of an object in motion, and then, depending on the results, they are directed towards a storage or scrap location.

Although it has the advantage of being faster, the method described in this document however only checks the compliance of the axial length of the pellets, without inspecting their diameter, and directs the non-faulty pellets towards a motionless storage plate, from which they have to be taken up again for integration into the pencil. Further, the ejection means is complicated to apply, and the vertical conveying is not stable.

Document DE 41 24 278 describes the successive measurement of several parameters, by distinct means, also after individualization of the pellets, which is not optimum as regards production rate and cost of the measuring devices.

DISCUSSION OF THE INVENTION

The invention proposes finding a remedy to these drawbacks of the existing devices and among other advantages, getting rid of the constraints relative to the presently applied inspections.

In particular, the invention relates to a device and to a method for continuously determining axial dimensions of cylindrical objects during their displacement; this determination may be associated with the selection of compliant objects, for example by ejecting the other ones. The invention finds a particular application in the checking of compliance of rectified nuclear fuel pellets, and may be applied in a confinement system of the glove box type.

Under one of its aspects, the invention relates to a method for checking compliance of cylindrical objects conveyed at a constant controlled velocity along their axis, comprising the evaluation of the diameter of the objects by interaction of a light beam, for example, perpendicular to the displacement direction and which is renewed, the objects continuing to be displaced during the measurement interaction. With the thereby determined different successive diameters of sections of the objects, it is then possible to compute the diameter and the length of the object, dimensions which are compared with thresholds in order to check their compliance with required criteria. Advantageously, this checking of compliance is associated with a selection so that only compliant objects are retained.

According to an advantageous embodiment, the selection is also automated and directly associated with checking of compliance, in particular by actuating sorting means depending on the results of the check. Actuation may notably consists in opening a solenoid valve through which a gas may be blown on non-compliant objects for a determined time.

Under another aspect, the invention relates to a system adapted to such a method. In particular, the determination and selection device comprises linear conveying means, means for determining a dimension of a conveyed object perpendicularly to the conveying direction, notably an optical micrometer associated with means for converting the obtained signal, and a sorting system downstream from the determination means. The means for determining the dimension are associated with means for storing the thereby determined data, and with means for comparing data with thresholds, the results of the comparisons allowing the sorting system to be controlled.

The sorting system is preferably a pressurized gas ejection nozzle associated with a solenoid valve controlled by the means associated with the results of the comparisons. Advantageously, the conveying means comprise two parallel edges, the spacing of which is set, at least one of the edges being provided at the ejection.

DESCRIPTION OF THE DRAWINGS

The characteristics and advantages of the invention will be better understood upon reading the description which follows and with reference to the appended drawings, given as an illustration and by no means as a limitation.

DETAILED DISCUSSION OF PARTICULAR EMBODIMENTS

The inspecting and sorting according to the invention preferably occurs at the end of the method for producing nuclear fuel pellets. This particular application generates additional constraints inherent to the material of the objects to be sorted: nuclear fuel pellets are throughout their production method, handled in a sealed enclosure or glove box, comprising a plurality of modules for each step connected with each other through airlock systems, the pellets being displaced by conveyors. This embodiment is however only illustrative, and it is possible to use the method and the device according to the invention upstream from this step, or on other continuously conveyed cylindrical samples.

Figure 1:
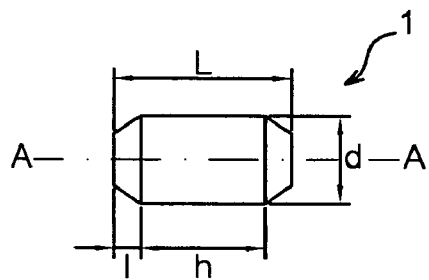
FIG. 1 shows a pellet for which the inspection may be applied.

A particular application example will be described for pellets, for example of the MOX type comprising a mixture of $PuO_2$ and $UO_2$, the shape of which is schematized in FIG. 1: the pellets 1 are generally cylindrical with an AA axis, a diameter d comprised between 8 and 10.5 mm, and length L comprised between 9.5 and 14.0 mm, have a beveled edge with an axial length 1 comprised between 0.05 and 0.5 mm at the ends. The compliance criteria conventionally are a few tens of micrometers, for the diameter d and a few tens of millimeters for the length L, h.

Figure 2:
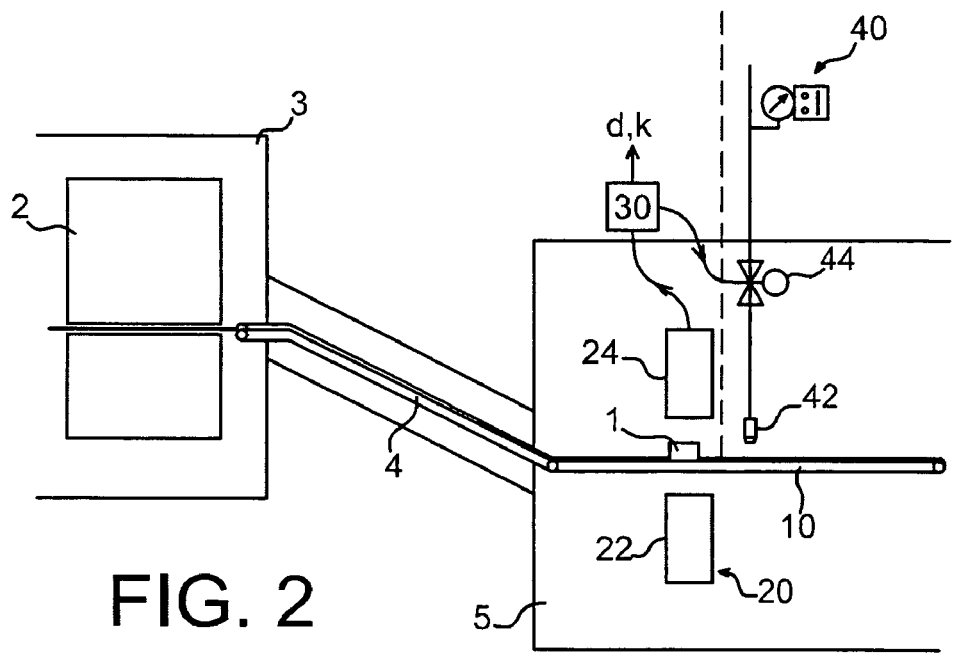
FIG. 2 schematically illustrates the rectification step and the step for inspecting and sorting a pellet during its production.

As illustrated in FIG. 2, after rectification by a grinder 2, the sintered fuel pellets 1 are transported from the rectification enclosure 3, preferably by a conveyor 4 with double toruses and horizontally towards an inspection and sorting enclosure 5; the horizontal position, i.e. along its axis AA, or <<laid>> position, of the pellet 1 is the most stable, and therefore conveying is less subject to blocking events and/or incidents.

Although this is not required, it is preferable to proceed with a change of conveyor 4 before the measurement: indeed, by adapting the relative velocities, it is possible to space out the pellets 1 and to impart to them a velocity which is particularly designed for the inspection system.

Dimensional compliance of the pellets 1 is, according to the invention, measured by continuous or semi-continuous inspection of a dimension of the pellet 1 perpendicularly to its displacement direction: the micrometer measures the diameter d of a pellet 1 laid on the conveyor 10.

Figure 3:
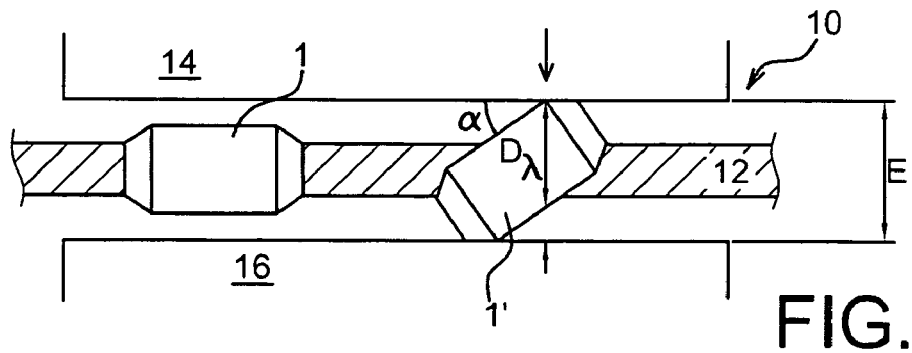
FIG. 3 shows a belt conveyor with edges, preferably used in the invention.

Thus, this appears to indicate that the conveyor 10 of pellets 1 for the measurement and sorting steps is preferably of the <<edge>> type as illustrated in FIG. 3 (cf. also FIG. 5), i.e. the pellets 1 move on a belt 12 between two edges 14, 16, the spacing E of which is calibrated so as to ensure proper orientation of the pellets 1 along their displacement. In particular, at the measurement level (arrow), the spacing E between the edges 14, 16 also allows the error margin to be also determined in the determination $D_\lambda$ of the diameter d, inherent to possible offset of the pellet 1. On the other hand, by using a belt conveyor, it is possible to have a simple interface with the upstream conveyor with toroids and, because of its very small width, it allows the measurement of pellets of small diameter. Thus, in the preferred exemplary embodiment, the spacing E of the edges is such that it guarantees a maximum deviation δ of 3 μm on the measurement $D_\lambda$ of the diameter d, in the case when the pellet 1' would be completely out of straight.

The conveyor 10 with edges thus brings the pellets 1 to the level of a preferably optical diameter detector 20; the edges 14, 16 are adapted to let through the measurement beam. The diameter is measured along a single generatrix, for example vertically. Preferably, the diameter detection means 20 comprise an optical micrometer coupled with means for computing and storing data; advantageously, the micrometer is of the light-emitting diode (LED) and high speed linear CCD (<<Charge Coupled Device>>) camera type like a Keyence™ micrometer; notably the LS 7000 micrometer provides a high rate of measurement, a long lifetime, low sensitivity to dust accumulation, while guaranteeing accuracy, repeatability and reproducibility of the measurements of parts in motion.

Figure 4A:
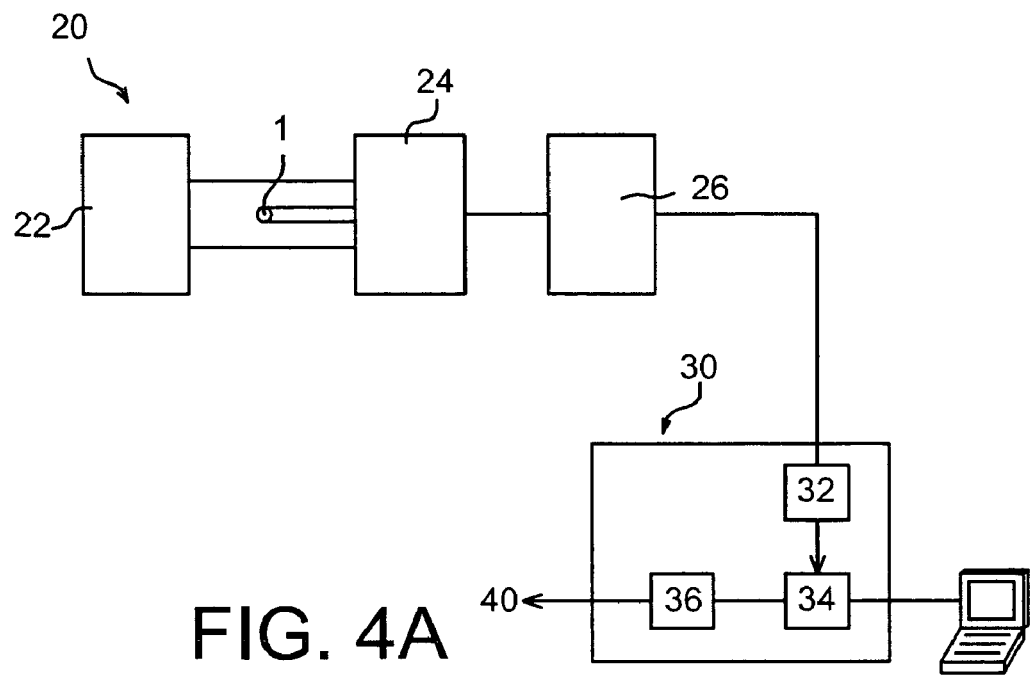
FIGS. 4A and 4B illustrate the measurement and the determination of the diameter.

More specifically, as illustrated in FIG. 4A, a micrometer 20 for detecting a dimension of an advancing object, comprises an transmitter 22 and a system 24 for receiving the ghost image of the pellet 1. It is further advantageous to provide a device, with which gas, notably nitrogen, may permanently be blown onto the glass pane of the system, either a transmitter 22 or a receiver 24, located under the conveyor 10 so as to prevent dusts which may perturb the measurement from settling on the glass pane. This blowing may for example provided by a hood which fits onto the relevant glass pane and with which the gas flow may be directed towards the glass pane and at the same time the light beam may be limited to a reduced useful measurement area; additionally, the upper face of the hood is preferably tilted so as to guarantee that no pellet having fallen from the conveyor line will remain on the slot and perturb the measurement.

Figure 4B:
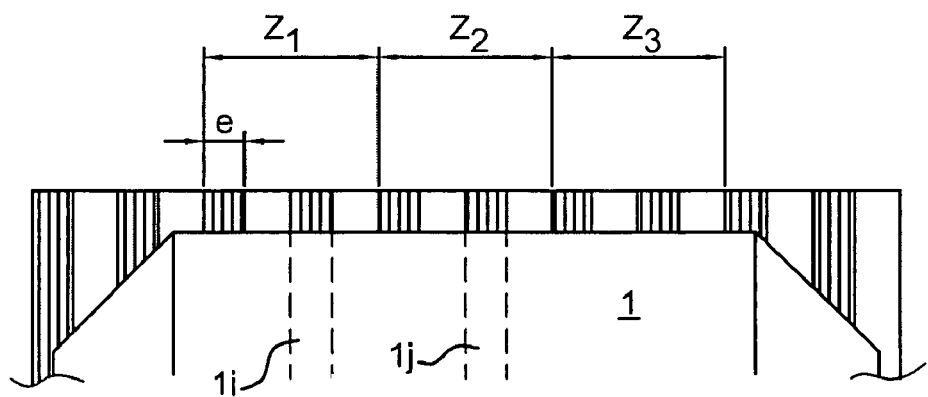

With the system 20, the diameter d may be measured quasi-instantaneously; a controller 26 associated with the micrometer 20 regularly determines the average $D_\lambda$ of the previous measurements, an average then being transmitted to a control unit 30 at predetermined intervals: the diameter $D_\lambda$ now received by the control and inspection unit 30 relates to a pellet section $1_i$ of thickness e (FIG. 4B). Because of the different times for computations and transmission, the diameter $D_\lambda$ transmitted and stored in storage means 32 of the unit 30 usually relates to non-contiguous sections $1_i$; according to the displacement velocity and the parameters selected for the transmission periods, the averages $D_\lambda$ are carried out on a variable number of measurements, and for each pellet 1, a number k of measurements of sections $1_i$ is stored.

The thereby determined diameter $D_\lambda$ stored in the memory 32 is then transmitted to means 34 with which different parameters may be checked. In particular, the diameter $D_\lambda$ is compared with tolerance thresholds; further, according to the number k of the thereby checked sections and with knowledge of the displacement velocity which is constant, it is possible to determine whether the length L of the pellet 1 meets the required criteria or not. Advantageously, shape irregularities may also be detected: the sections $1_i$ may be grouped together in several groups, notably three groups, $Z_1$, $Z_2$, $Z_3$, for which a measurement of the average $d_z$ of the diameter $D_\lambda$ is computed, in order to compare each average with the thresholds and to check uniformity of these averages. The different parameters are thereby measured via the determination of a single dimension $D_\lambda$, via the interaction of a single beam, which reduces costs and complexity of the system, in particular within the confined environment 5.

The inspection and control unit 30, usually a microcomputer, moreover advantageously comprises means 36 for actuating a device 40 for ejecting pellets 1 for which a non-compliance verdict is established. In particular, ejection is produced by blowing gas, advantageously nitrogen, via a nozzle 42 in a direction normal to the advance of the pellets 1; the nozzle 42 is directly arranged in one of the edges 14 of the conveyor 10. The detection of non-compliant (diameter, length, or shape) pellets 1 causes actuation of a solenoid valve 44 allowing passage of pressurized gas and directing the relevant pellets 1 out of the conveyor 10 towards the scrap, while the other ones continue to move towards a next step.

The pressure and the ejection time are selected depending on the distance between the measurement beam and the nozzle, the rated displacement velocity, and the length of the pellets, so as to be able to surely scrap a single pellet 1, i.e. in order to eject the out-of-tolerance pellets with 100% efficiency, but only the latter. The minimum ejection pressure is of the order of 3-4 bars; for example, for an operating velocity range of the order of 65±10 mm/s and for pellets with a length of about 11.5 mm, of a diameter of about 8.2 mm and weighing about 6.5 g which advance, laid down, the operating pressure was selected beyond this limit, close to 6 bars.

Figure 5A:
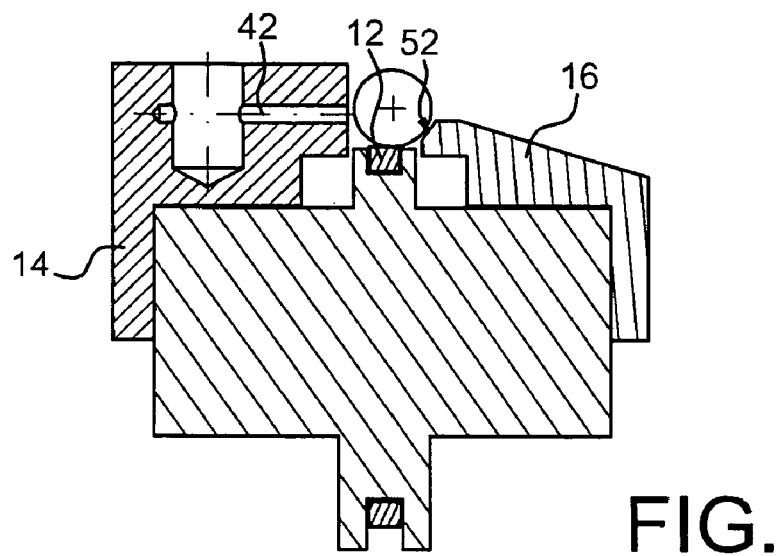
FIGS. 5A and 5B show different conveying aspects at the ejection.
Figure 5B:
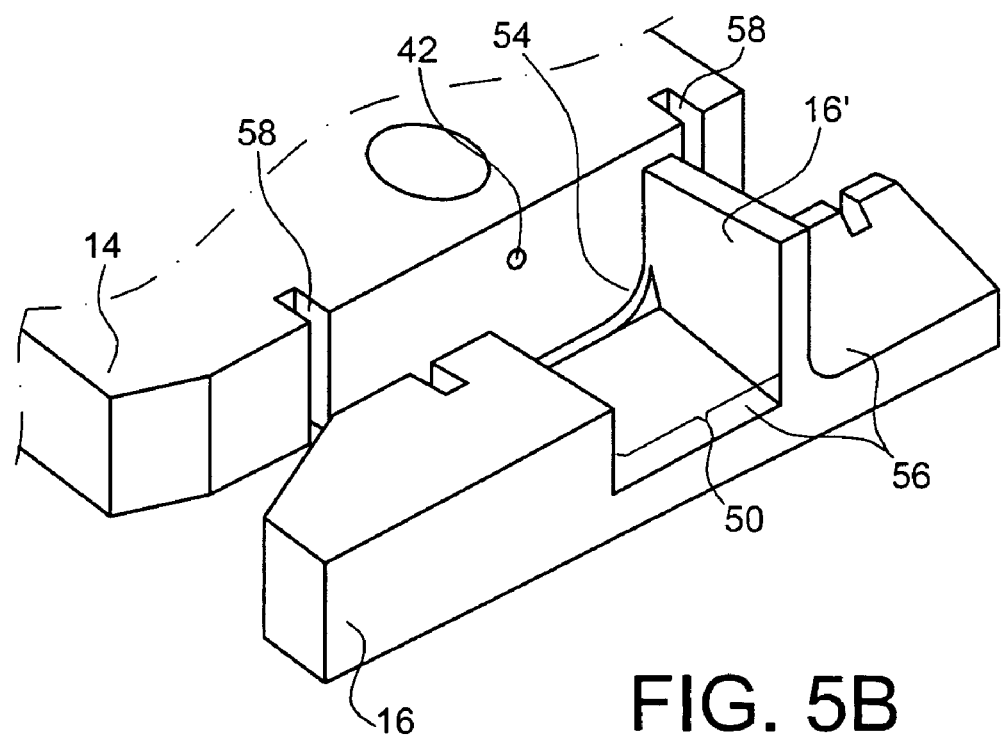

For this purpose, as illustrated in FIG. 5, the edge 16 opposite to the nozzle 42 is adapted for guiding the pellets, including the upright pellets, right up to the ejection nozzle 42, so as to provide a passage for the blown pellets above the edge 16, in order to prevent non-compliant pellets from having the possibility of returning onto the conveyor 12 in the case of bouncing during the blowing, and to re-engage the other ones, compliant with the specifications, into between calibrated edges. In particular, the edge 16 is locally lowered below the axis of the pellets over a ejection window 50 with a length of about 15 mm, upstream and downstream from the ejection nozzle 42; with a tilted plane 52, it is possible during the blowing, to cause the pellets to <<take off>> from the conveyor 12. The rise of the edge 16 at the outlet of the ejection window 50 is specially machined 54 so as to be able to gradually guide the compliant pellets which would have moved sideways in the (wider) window 50 and to re-engage them into the raised edge 16'. Moreover, in order to avoid any bouncing of the pellets, a tilted plane 56 may be provided.

On the other hand, in order not to have to parameterize the position of the beam relatively to the conveyor 10, it is desirable that the support of the micrometer 20 and the conveyor 10 be integral with each other, for example with the presence of a layout 58 in the edges for letting through the beam. Also, the position of the ejection nozzle 42 is integrated into the calibrated edge 14 which does not contain the ejection window 50. In this configuration, except when changing a part, the only dimension which may change following disassembly/reassembly or wear by friction, is the spacing E between the calibrated edges 14, 16. A <<low-pass>> gauge consisting of a standard pellet mounted on a support may be used in order to check this, for example at least once a week in an industrial configuration and after any disassembly and reassembly of the calibrated edges. Generally, the edge 14 comprising the ejection means 40 and the determination means 20 is considered as being fixed and the other edge 16 may be displaced relatively to it in order to adjust the spacing E.

The conveyor 10 may be provided with other means downstream from the ejection allowing a second determination of the diameter, for example a micrometer similar to the first, in order to inspect the quality of the previous sorting.

Figure 6:
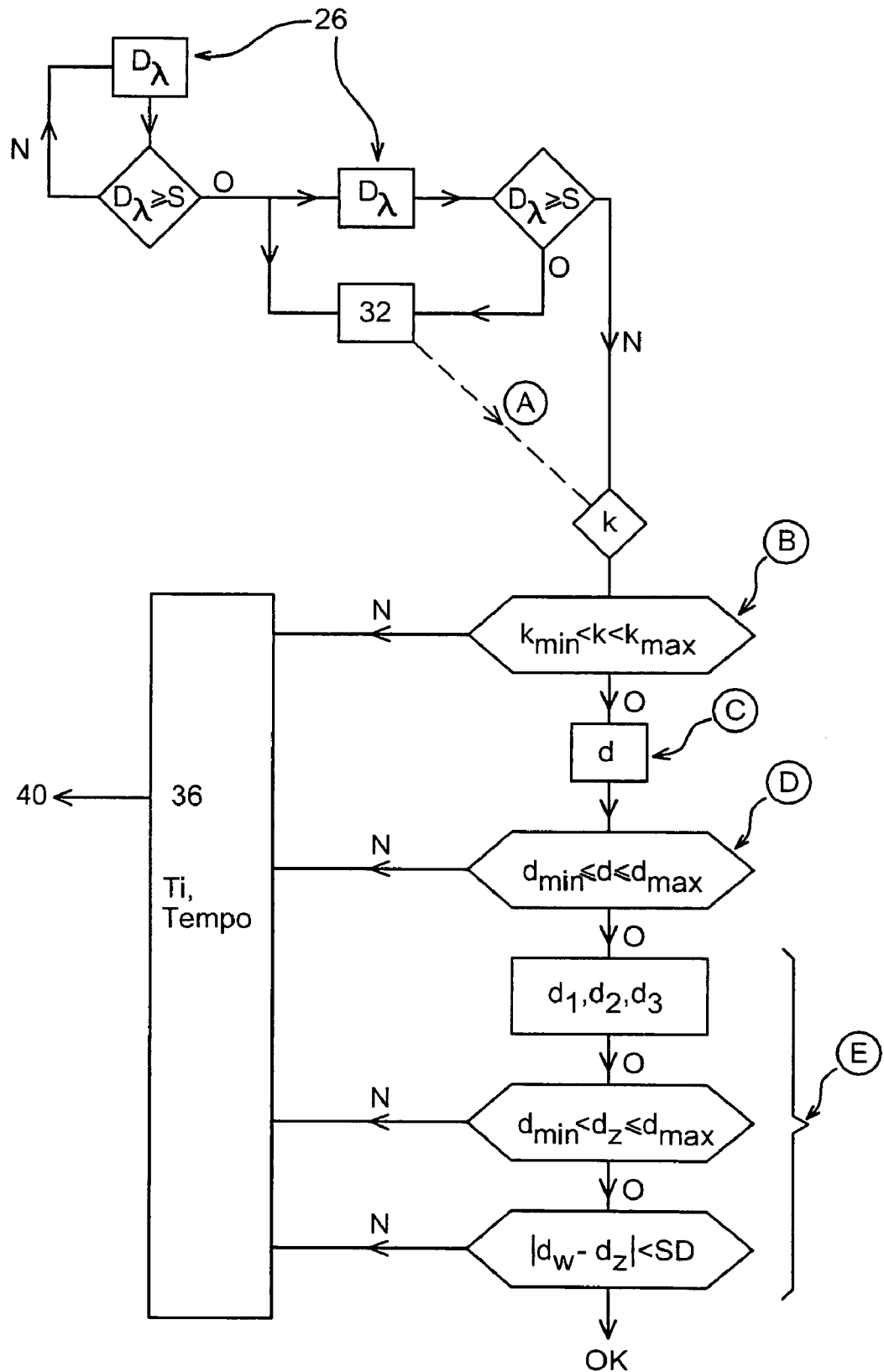
FIG. 6 is a diagram repeating the steps of the sorting method.

More specifically, a determination and sorting method according to the invention may repeat the steps schematized in FIG. 6.

In a first phase, the diameter $D_\lambda$ transmitted by the determination means 26, resulting from the measurement by the micrometer 20, is compared to a threshold S in order to determine whether a pellet 1 is passing under the beam 20.

When the threshold S is no longer attained, it is considered that the pellet 1 has entirely passed through, and the inspection method as such may start.

In a first step A, the number k of collected sections for the pellet 1, i.e. the number of stored $D_\lambda$ values while the determined diameter $D_\lambda$ exceeded the threshold S, is computed.

In a second step B, this number of sections k is compared to two maximum and minimum acquisition values of sections during one pellet 1 passage, in order to evaluate whether the length L of pellet 1 meets predefined criteria: if $k > k_{max}$, it is considered that these pellets are too long or joined, and they are ejected; conversely, if $k < k_{min}$, it is considered that the pellet is too short and it is ejected.

It should be noted that in fact this functionality has the main advantage of allowing pellets or pieces of pellets to be scrapped, which may block the whole of the transit operations downstream from the sorting. In particular, if a pellet, even quite compliant, moves <<upright>>, i.e. its axis AA is perpendicular to the displacement direction, which risks causing blockings considering the instability of the position, it is detected as having a too short length and is ejected. Also, if pellets are stuck to each other, so that detection of the space between them is not possible, the relevant pellets will be ejected (because they are too long): except for the loss of possibly valid pellets, such a formation does not mar the reliability of the sorting, and does not maintain <<false positive>> pellets. The thresholds $k_{min}$ and $k_{max}$ are set in order to ensure ejection of a pellet just below the minimum length moving at maximum velocity and the ejection of two joined pellets (with a resulting length just above the maximum length).

In a third step C, a selection of interesting sections of the pellet 1, considered as compliant with the specifications of length L is performed. Indeed, for computing the diameter d, both ends including a beveled edge should be ignored, for which the diameter is non-representative; also, it is preferable not to carry out the sorting on the basis of a measurement too close to this end area.

For this purpose, on the number k of stored $D_\lambda$ values, $k_i$ and $k_f$ sections are respectively ignored at the beginning and at the end of acquisition; $k_i$ and $k_f$ are determined depending on the retained displacement velocity, on the minimum length intended to be ignored at the pellet's begin and end, and on the number of averaged values per diameter $D_\lambda$. For example, for a displacement velocity close to 65 mm/s and 16 averaged measurements by the means 26 before transmitting $D_\lambda$, $k_i = k_f = 3$ sections is set in order to ignore 1.2 mm at the beginning and at the end of each pellet.

The diameter d of the pellet 1 is then computed as being the average of the $D_\lambda$ measurements on the $(k - k_i - k_f)$ useful sections.

Compliance of the pellet 1 as regards its diameter d is determined in a fourth step D by comparing the computed diameter d with two acceptable maximum $d_{max}$ and minimum $d_{min}$ thresholds, respectively set to about 10 μm around the rated diameter.

It is also possible during a fifth step E to compute the diameter per pellet area. In particular, the number of sections concerned by the beginning, centre and end areas $Z_1$, $Z_2$ and $Z_3$ of pellet 1 is determined and the diameter $d_1$, $d_2$ and $d_3$ is determined for each of them. Each of these values is similarly compared with the maximum $d_{max}$ and minimum $d0_{min}$ thresholds; further the deviations $|d_1 - d_2|$, $|d_2 - d_3|$ and $|d_1 - d_3|$ are compared with a threshold SD beyond which the shape defect is considered as unacceptable.

If the pellet 1 is considered as compliant, it continues its displacement on the conveyor 10. If, at any of steps B, D and E, the pellet is detected as being non-compliant, the control means 36 trigger the solenoid valve 44 and ejection of the pellet 1.

The required pulse time is validated by tests, and depends on the length of the parts to be ejected, on their displacement velocity and on their mass. In particular, it is found that an opening time of the ejection valve 44 of the order of $T_i=0.09$ s is suitable for a pellet of 6.4 g with a rated length L=11.5 mm, at the velocity of 65 mm/s; this blowing time corresponding to a length of 6 mm. Moreover, as the nozzle 42 is spaced apart from the determination laser 20, a spacing which may moreover be optimized, and the pellet 1 is moving, a temporization $T_{empo}$ between the determination of non-compliance and actuation is required, for example of 0.20 s for a 26 mm spacing between the beam 20 and the nozzle 42.

The determination and sorting system according to the invention, was checked and qualified for an industrial manufacturing method; in particular, many means are integrated thereto for detecting possible errors and/or incidents. Tests in an industrial configuration have also demonstrated the ejection of all the out-of-standard pellets.

The invention claimed is:

1. A method for checking dimensional compliance of cylindrical objects comprising:
    displacement at a predetermined velocity of the objects in a direction parallel to their axis (AA);
    interaction of a beam with the object perpendicularly to its displacement direction;
    determination of the diameter of a plurality of sections of the object by means of the representative signal of the interaction of said beam;
    computation of a diameter representative of the object on the basis of the determined diameters ($D_\lambda$) of the sections;
    computation of a characteristic k representative of the length L of the object on the basis of the number k of sections $l_i$ for which the diameter $D_\lambda$ was determined;
    comparison of the computed diameter d and length L with thresholds $d_{min}$, $d_{max}$, $k_{min}$, $k_{max}$ with which the compliance of the object may be checked.

2. The method according to claim 1, next comprising a selection of objects depending on their compliance.

3. The method according to claim 2, comprising the actuation of sorting means depending on the comparisons of the diameter and length (d, L) in order to provide selection.

4. The method according to claim 3, wherein the actuation of the sorting means comprises the opening of a solenoid valve for a determined time $T_i$, and selection is provided by a blowing gas passing through the solenoid valve.

5. The method according to claim 1 applied to nuclear fuel pellets.

6. A device for determining compliance of pellets comprising:
    linear conveying means;
    a system for determination of a single dimension $D_\lambda$ perpendicular to the conveying direction and during the conveying;
    means for storing determined dimensions $D_\lambda$;
    means for computing representative values of the length and diameter of the pellet by means of the plurality of the sole stored dimensions $D_\lambda$ and for comparing the values with thresholds;
    a sorting system downstream from the determination system associated with the conveying means;
    means for actuating the sorting system via the results of the comparisons by the comparing means.

7. The device according to claim 6, wherein the computing means comprise means for averaging a certain number of stored dimensions $D_\lambda$.

8. The device according to claim 6, wherein the sorting system is a pressurized gas ejection nozzle perpendicular to the conveyor.

9. The device according to claim 8, comprising a solenoid valve connected to the ejection nozzle and controlled by the means for actuating the sorting system.

10. The device according to claim 8, wherein the conveying means comprise two parallel edges along the conveying direction, one of the edges being at least arranged at the ejection nozzle.

11. The device according to claim 6, wherein the determination system comprises a laser micrometer.

12. The device according to claim 6, associated with a glove box.

* * * * *